United States Patent
Iwasaki

(10) Patent No.: US 8,553,139 B2
(45) Date of Patent: Oct. 8, 2013

(54) IMAGE PICKUP APPARATUS

(75) Inventor: Hiroaki Iwasaki, Hino (JP)

(73) Assignee: Olympus Imaging Corp., Tokyo (JP)

( * ) Notice: Subject to any disclaimer, the term of this patent is extended or adjusted under 35 U.S.C. 154(b) by 135 days.

(21) Appl. No.: 12/987,506

(22) Filed: Jan. 10, 2011

(65) Prior Publication Data

US 2011/0181754 A1    Jul. 28, 2011

(30) Foreign Application Priority Data

Jan. 25, 2010    (JP) .................. 2010-013392

(51) Int. Cl.
- G03B 7/00    (2006.01)
- H04N 5/235    (2006.01)
- H04N 5/238    (2006.01)
- H04N 3/14    (2006.01)
- H04N 5/335    (2011.01)

(52) U.S. Cl.
USPC ........... 348/362; 348/296; 348/297; 348/363; 348/364

(58) Field of Classification Search
None
See application file for complete search history.

(56) References Cited

U.S. PATENT DOCUMENTS

| | | | | |
|---|---|---|---|---|
| 2006/0098115 | A1* | 5/2006 | Toyoda | 348/362 |
| 2008/0284873 | A1* | 11/2008 | Miyanari | 348/229.1 |
| 2008/0291317 | A1* | 11/2008 | Endo et al. | 348/340 |
| 2009/0213233 | A1* | 8/2009 | Kido | 348/208.4 |
| 2010/0045852 | A1* | 2/2010 | Tanaka et al. | 348/362 |
| 2011/0069218 | A1* | 3/2011 | Namai et al. | 348/362 |

FOREIGN PATENT DOCUMENTS

| | | |
|---|---|---|
| CN | 101167347 | 4/2008 |
| JP | 11-041523 | 2/1999 |
| JP | 2008-219524 | 9/2008 |
| JP | 2010-011392 | 1/2010 |
| JP | 2010-183297 | 8/2010 |

OTHER PUBLICATIONS

First Office Action for Chinese Patent Application No. 201010541083.7, mailed Oct. 10, 2012 (5 pgs.).
Office Action for Japanese Patent Application No. 2010-013392, mailed May 7, 2013 (7 pgs.).

* cited by examiner

Primary Examiner — Sinh Tran
Assistant Examiner — Jason Flohre
(74) Attorney, Agent, or Firm — John C. Pokotylo; Straub & Pokotylo

(57) ABSTRACT

The present invention is an image pickup apparatus including an image pickup device having an image pickup plane on which pixels are two-dimensionally arranged, a mechanical rear curtain shutter that runs along the image pickup plane to control passage/shielding of light, a system control section that divides the image pickup plane into a plurality of pixel groups along the running direction ahead of running of the mechanical rear curtain shutter and collectively resets charge of all pixels in one pixel group sequentially at timing per pixel group according to running characteristics of the mechanical rear curtain shutter, and an image processing section that corrects a signal level of an image signal read from the image pickup device to approximate to an image signal obtained when the pixels have a same exposure time based on the running characteristics of the mechanical rear curtain shutter and reset timing for each pixel group.

4 Claims, 10 Drawing Sheets

IMAGE PICKUP APPARATUS

CROSS REFERENCE TO RELATED APPLICATION

This application claims benefit of Japanese Application No. 2010-013392 filed in Japan on Jan. 25, 2010, the contents of which are incorporated by this reference.

BACKGROUND OF THE INVENTION

1. Field of the Invention

The present invention relates to an image pickup apparatus configured to make an exposure by combining an electronic front curtain shutter and a mechanical rear curtain shutter.

2. Description of the Related Art

Conventionally, single-lens reflex type cameras (digital cameras and silver-salt cameras or the like) control an exposure time through a mechanical shutter such as a focal plane shutter.

The focal plane shutter is generally made up of two curtains; a front curtain and a rear curtain, and the front curtain shades an image pickup device (a film in the case of a silver-salt camera, but hereinafter, an image pickup device will be taken as a representative example) before photographing (1, front curtain closed). After that, when a photographing button or the like is operated, a photographing operation starts, a charged spring is released and the front curtain thereby starts running first (2, front curtain running). Accompanying the running of the front curtain, exposure is sequentially started, for example, from the top end of the image pickup device. If the shutter speed is equal to or below a synchronized speed, when the front curtain finishes running, a state is realized in which the entire surface of the image pickup device is under exposure (3, front curtain finishes running) (however, when the shutter speed is faster than the synchronized speed, the rear curtain starts running before the front curtain finishes running, and so exposure is performed in a slit shape). When the front curtain starts running and an exposure time corresponding to the shutter speed elapses, the rear curtain starts running by releasing the charged spring and shading is sequentially started from the top end of the image pickup device (4, rear curtain running). When the rear curtain finishes running, the entire surface of the image pickup device is shaded (5, rear curtain finishes running) An image signal is then read from the image pickup device in the shaded state after the rear curtain finishes running.

In this way, the conventional camera controls an exposure start through running of the mechanical front curtain shutter and controls an exposure end through running of the mechanical rear curtain shutter, and thereby controls a time of exposure to the image pickup device when photographing a still image.

However, with a short-time exposure, it is difficult to perform mechanical control while maintaining high accuracy, and in an example of the focal plane shutter, it is difficult to control an exposure time shorter than 1/8000 seconds. Therefore, the order of 1/8000 seconds is an upper limit to the shutter speed of a camera adopting a focal plane shutter.

To solve such problems, a technique using an electronic shutter is proposed as a technique for allowing higher accuracy control using a high-speed shutter or realizing a higher speed shutter.

For example, Japanese Patent Application Laid-Open Publication No. 11-41523 describes a technique for an image pickup apparatus using an XY address type image pickup device such as a CMOS image pickup device that controls a charge accumulation start time of the image pickup device using an electronic front curtain shutter realized by pixel reset instead of a mechanical front curtain shutter and uses a mechanical rear curtain shutter (focal plane shutter) for controlling a charge accumulation end time. In this case, by controlling running characteristics of the electronic front curtain shutter (that is, running characteristics of sequentially resetting pixels from the top line to the bottom line) according to non-linear running characteristics of the mechanical rear curtain shutter, it is possible to perform still image photographing for a substantially uniform exposure time over the entire region of the image pickup device.

Here, with the aforementioned electronic front curtain shutter, pixels are generally reset collectively for every plurality of lines, instead of resetting pixels line by line (hereinafter, an electronic front curtain shutter realized by sequentially resetting pixels for every plurality of lines will be referred to as "block electronic front curtain" or the like for brevity). Adoption of such a reset method is intended to simplify the drive circuit or eliminate the necessity of an expensive drive clock.

SUMMARY OF THE INVENTION

In brief, the present invention is an image pickup apparatus including a photographing lens that forms a subject image, an image pickup device having an image pickup plane on which pixels for accumulating an amount of charge corresponding to a light quantity of light received via the photographing lens are two-dimensionally arranged, a mechanical rear curtain shutter that runs along the image pickup plane to move from a state in which light from the photographing lens reaches the image pickup plane to a shaded state, a reset section that divides the image pickup plane into a plurality of pixel groups along the running direction ahead of running of the mechanical rear curtain shutter and collectively resets charge of all pixels included in one pixel group sequentially at timing per pixel group according to running characteristics of the mechanical rear curtain shutter, and an image processing section that corrects a signal level of an image signal read from the image pickup device so as to approximate to an image signal obtained when the pixels have a same exposure time based on the running characteristics of the mechanical rear curtain shutter and reset timing for each pixel group by the reset section.

The above and other objects, features and advantages of the invention will become more clearly understood from the following description referring to the accompanying drawings.

DETAILED DESCRIPTION OF THE PREFERRED EMBODIMENT

Figure 1:
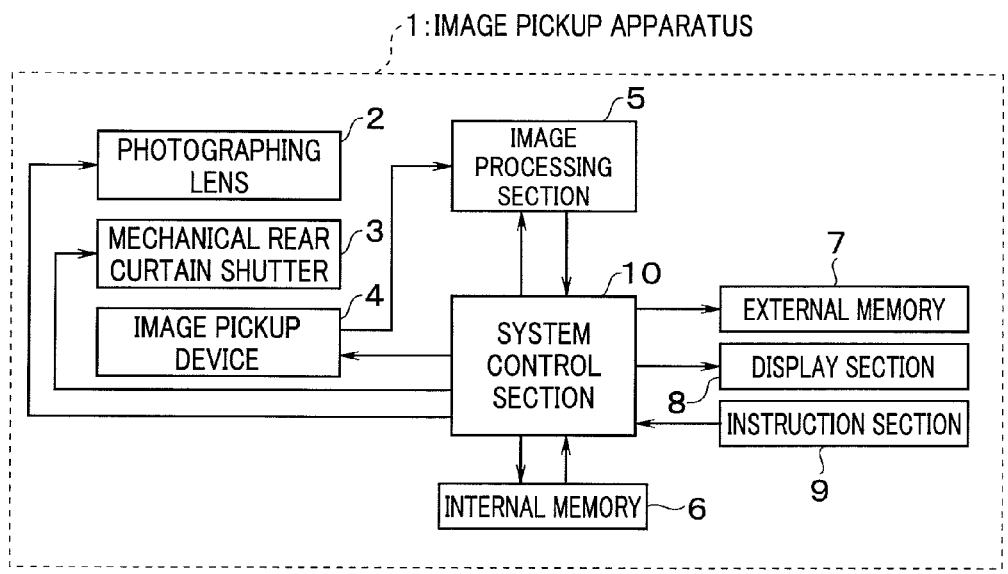
FIG. 1 is a block diagram illustrating a configuration of an image pickup apparatus according to Embodiment 1 of the present invention.

Hereinafter, an embodiment of the present invention will be described with reference to the accompanying drawings.
[Embodiment 1]
FIG. 1 to FIG. 14 show Embodiment 1 of the present invention and FIG. 1 is a block diagram illustrating a configuration of an image pickup apparatus.

The image pickup apparatus 1 of the present embodiment is configured, for example, as a digital camera and is provided with a photographing lens 2, a mechanical rear curtain shutter 3, an image pickup device 4, an image processing section 5, an internal memory 6, an external memory 7, a display section 8, an instruction section 9 and a system control section 10.

The photographing lens 2 is a photographing optical system for forming a subject image on an image pickup plane 22 (see FIG. 2 or the like) of the image pickup device 4 and is configured by including a diaphragm, a focus lens or the like.

The mechanical rear curtain shutter 3 is disposed between the image pickup device 4 and the photographing lens 2, regulates a passage time of luminous flux from the photographing lens 2 to the image pickup device 4 to thereby control exposure. To be more specific, the mechanical rear curtain shutter 3 closes an exposure opening 31 (see FIG. 3 to FIG. 7) by running in the vertical direction to shut the passage of luminous flux or opens the exposure opening 31 to allow the passage of luminous flux, controls opening/closing timing and thereby controls a time of exposure to the image pickup device 4. Here, the mechanical rear curtain shutter 3 is structured to run along the image pickup plane 22 of the image pickup device 4 by an elastic force of a spring charged when the mechanical rear curtain shutter 3 performs a closing operation while gradually accelerating from speed 0, and therefore has running characteristics, and the closing operation requires a certain degree of time. The running characteristics will be described in more detail later. An opening operation of the mechanical rear curtain shutter 3 is performed by charging the spring using a motor or the like.

The image pickup device 4 is intended to photoelectrically convert an optical image formed via the photographing lens 2 and generate an electric image signal. However, the image pickup device 4 of the present embodiment is designed to be an image pickup device capable of sequentially performing pixel reset in units of a plurality of lines (here, the line direction is a direction orthogonal to the running direction of the mechanical rear curtain shutter 3). Specific examples of the image pickup device 4 include an XY address type image pickup device such as CMOS image pickup device, but the image pickup device 4 is not limited thereto.

The image processing section 5 is intended to apply various kinds of image processings to the image signal picked up by the image pickup device 4. Here, the image processing performed by the image processing section 5 also includes processing of correcting the signal level of the image signal read from the image pickup device 4 so as to approximate to an image signal obtained when respective pixels 21 have the same exposure time (see FIG. 2 or the like) based on the running characteristics of the mechanical rear curtain shutter 3 and reset timing per pixel group by the system control section 10 that functions as a reset section as will be described later. The image data from the image processing section 5 is sent to the system control section 10.

The internal memory 6 is intended to store various processing programs, set values or the like necessary to operate the image pickup apparatus 1 in a non-volatile manner, and to be more specific, is made up of a non-volatile memory such as flash memory.

The external memory 7 is intended to store image data photographed and processed for recording by the image processing section 5 in a non-volatile manner and is configured as a removal memory that can be carried outside the image pickup apparatus 1 such as a so-called memory card.

The display section 8 is intended to display the image photographed and processed for display by the image processing section 5 and a menu or the like related to operations of the image pickup apparatus 1 and is configured as a display device such as TFT liquid crystal or organic EL substrate.

The instruction section 9 is a user interface to input operations on the image pickup apparatus 1 and includes a power supply button to instruct ON/OFF of a power supply, a photographing button to instruct a photographing start and various other setting buttons or the like.

The system control section 10 is intended to perform control on the entire image pickup apparatus 1. For example, upon receiving an instruction from the user via the instruction section 9 (e.g., instruction of still image photographing), the system control section 10 performs control of a diaphragm or autofocus of the photographing lens 2 or the like and further performs timing control of the image pickup device 4 and opening/closing timing control of the mechanical rear curtain shutter 3. Here, the system control section 10 functions as a reset section in timing control of the image pickup device 4, divides the image pickup plane 22 of the image pickup device 4 into a plurality of pixel groups along the running direction ahead of the running of the mechanical rear curtain shutter 3 as will be described later with reference to the accompanying drawings and collectively resets charge of all pixels included in one pixel group sequentially at timing per pixel group according to the running characteristics of the mechanical rear curtain shutter 3. Furthermore, the system control section 10 also functions as an image signal reading section that causes an image signal to be read from the image pickup device 4 and further performs control of receiving the image data processed by the image processing section 5 and displaying the image on the display section 8 or control of saving the image in the external memory 7.

Figure 2:
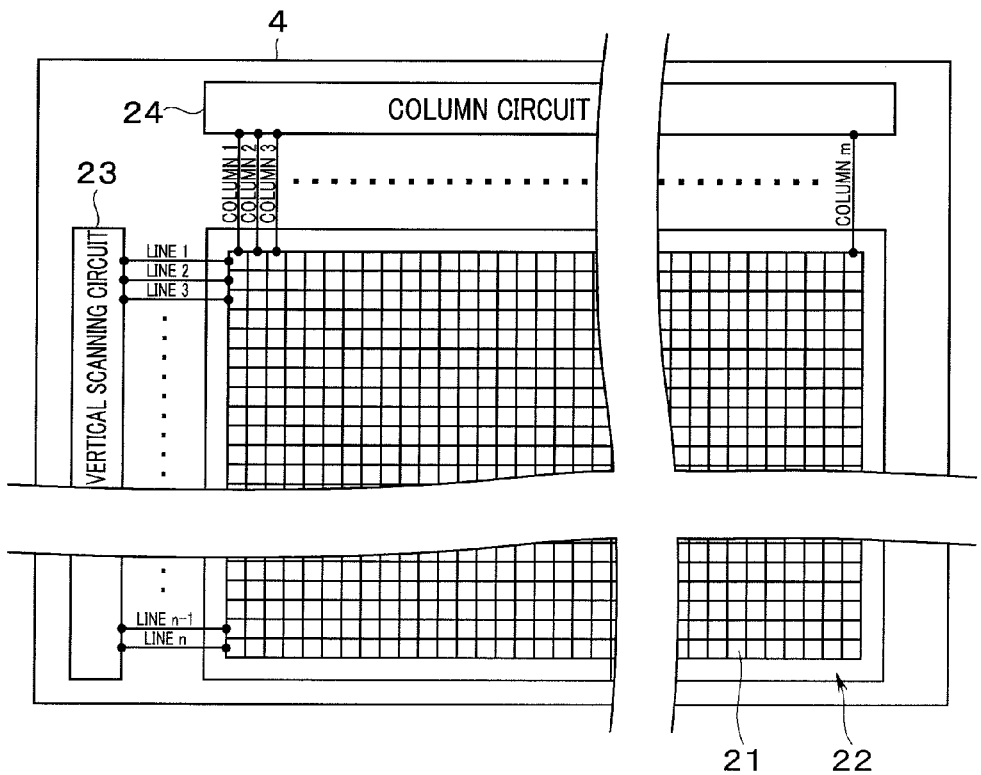
FIG. 2 is a diagram illustrating a configuration of an image pickup device according to Embodiment 1 described above.

Next, FIG. 2 is a diagram illustrating a configuration of the image pickup device 4.

The image pickup device 4 is provided with the image pickup plane 22 on which a plurality of pixels 21 are two-dimensionally arranged, a vertical scanning circuit 23 and a column circuit 24. FIG. 2 illustrates the image pickup plane 22 on which the pixels 21 are arrayed in n rows x m columns (here, n and m are positive integers).

Here, the pixel 21 is configured by including a photodiode that converts light received via the photographing lens 2 to an amount of charge corresponding to the light quantity and accumulates the charge and a pixel circuit section that converts the charge accumulated in the photodiode to a voltage, amplifies and switches the voltage and delivers the voltage to the column circuit 24 as an electric signal.

The vertical scanning circuit 23 is intended to control lines which are sequences in the horizontal direction of the pixels 21 arranged on the image pickup plane 22, transmits a control signal to the pixel circuit section for each line and controls electronic reset timing and electric signal reading timing. In the example shown in FIG. 2, the lines controlled by the vertical scanning circuit 23 are n lines of lines 1 to n.

The column circuit 24 is intended to control columns which are sequences in the vertical direction of the pixels 21 arranged on the image pickup plane 22 and mainly applies a gain to an electric signal or the like. In the example shown in FIG. 2, columns controlled by the column circuit 24 are m columns of columns 1 to m. Furthermore, the column circuit 24 may also be of a type that performs A/D conversion processing (A/D conversion processing is conventionally performed by independent ICs, but products have been developed in recent years which perform A/D conversion processing through the column circuit).

Figure 6:
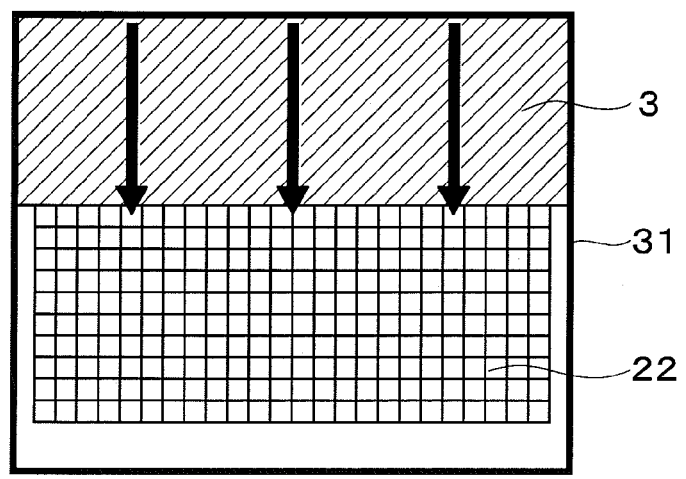
FIG. 6 is a diagram illustrating the image pickup device and the mechanical rear curtain shutter when rear curtain running is in progress according to Embodiment 1 described above.
Figure 7:
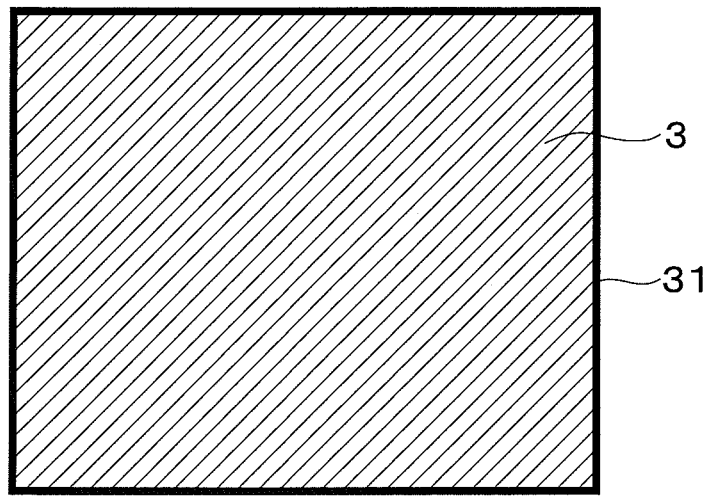
FIG. 7 is a diagram illustrating the image pickup device and the mechanical rear curtain shutter when rear curtain running is completed according to Embodiment 1 described above.

Next, operations of the image pickup device 4 and mechanical rear curtain shutter 3 when photographing a still image will be described with reference to FIG. 3 to FIG. 7. Here, FIG. 3 is a diagram illustrating the image pickup device 4 and the mechanical rear curtain shutter 3 before photographing, FIG. 4 is a diagram illustrating the image pickup device 4 and the mechanical rear curtain shutter 3 when electronic reset is in progress, FIG. 5 is a diagram illustrating the image pickup device 4 and the mechanical rear curtain shutter 3 when the electronic reset is completed and before the rear curtain starts running, FIG. 6 is a diagram illustrating the image pickup device 4 and the mechanical rear curtain shutter 3 when rear curtain running is in progress and FIG. 7 is a diagram illustrating the image pickup device 4 and the mechanical rear curtain shutter 3 when rear curtain running is completed.

Figure 3:
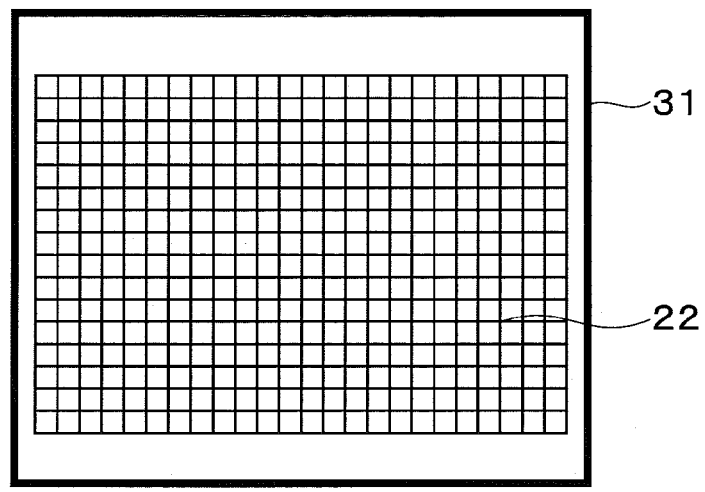
FIG. 3 is a diagram illustrating the image pickup device and the mechanical rear curtain shutter before photographing according to Embodiment 1 described above.
Figure 4:
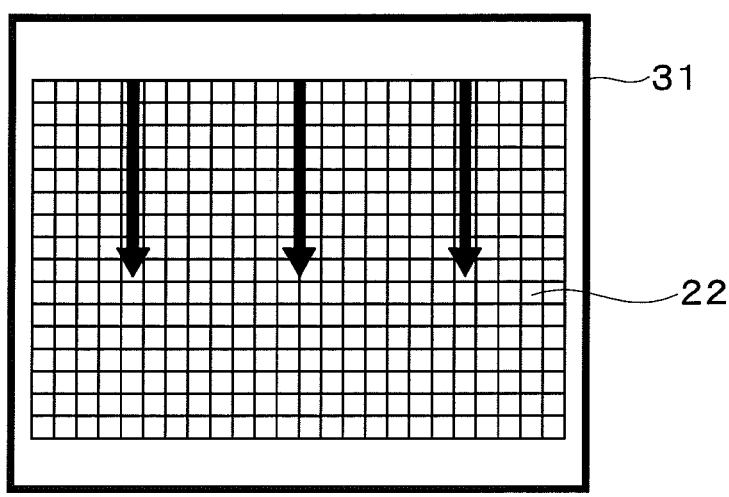
FIG. 4 is a diagram illustrating the image pickup device and the mechanical rear curtain shutter when electronic reset is in progress according to Embodiment 1 described above.

In the state before photographing shown in FIG. 3, the mechanical rear curtain shutter 3 is retracted from the exposure opening 31 and left open, and the image pickup device 4 is irradiated with and exposed to light from the photographing lens 2.

In the state shown in FIG. 3, when the photographing button of the instruction section 9 is pressed and a signal for instructing a photographing start is transmitted from the instruction section 9 to the system control section 10, a photographing operation on a still image is started. First, as shown in FIG. 4, the vertical scanning circuit 23 of the image pickup device 4 starts electronic reset for resetting the charge accumulated in the photodiodes of the respective pixels 21. The electronic reset is started from the line at the top end (line 1) of the image pickup device 4, sequentially performed downward in units of a plurality of lines and ends when the line at the bottom end (line n) is reached (FIG. 5 shows a state in which the electronic reset has ended). Since charge is accumulated again in the photodiodes after the electronic reset, exposure start timing of an arbitrary pixel 21 corresponds to timing at which the electronic reset of the pixel 21 ends.

Figure 5:
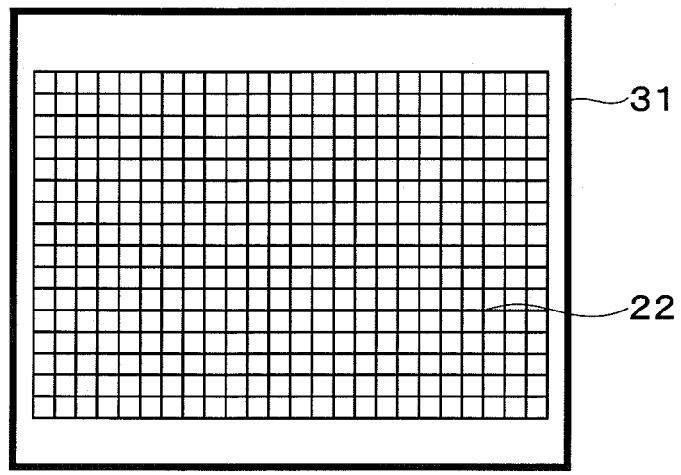
FIG. 5 is a diagram illustrating the image pickup device and the mechanical rear curtain shutter when the electronic reset is completed and before the rear curtain starts running according to Embodiment 1 described above.

Since FIG. 5 shows a case where the shutter speed is equal to or below a synchronized speed, when the electronic reset reaches the line at the bottom end (line n), exposure is performed over the entire surface of the image pickup device 4 (by contrast, when the shutter speed is faster than the synchronized speed, the mechanical rear curtain shutter 3 starts running before the electronic reset reaches the line at the bottom end (line n), and therefore exposure is performed in a slit shape as in the case of the normal focal plane shutter described in the related art).

When there is an exposure time manually set by the instruction section 9, the system control section 10 stores the exposure time and when there is no manually set exposure time, the system control section 10 stores an automatically set exposure time according to the luminance of the subject, and controls the mechanical rear curtain shutter 3 so that the mechanical rear curtain shutter 3 starts running when the exposure time has elapsed after the aforementioned electronic reset started.

This causes the mechanical rear curtain shutter 3 to start running as shown in FIG. 6 and shading is performed sequentially from the line at the top end (line 1) of the image pickup device 4 downward.

After that, as shown in FIG. 7, when the mechanical rear curtain shutter 3 closes the entire exposure opening 31 and finishes running, the entire surface of the image pickup device 4 is shaded.

When the entire surface of the image pickup device 4 is shaded as shown in FIG. 7, the vertical scanning circuit 23 sequentially reads electric signals line by line.

Figure 8:
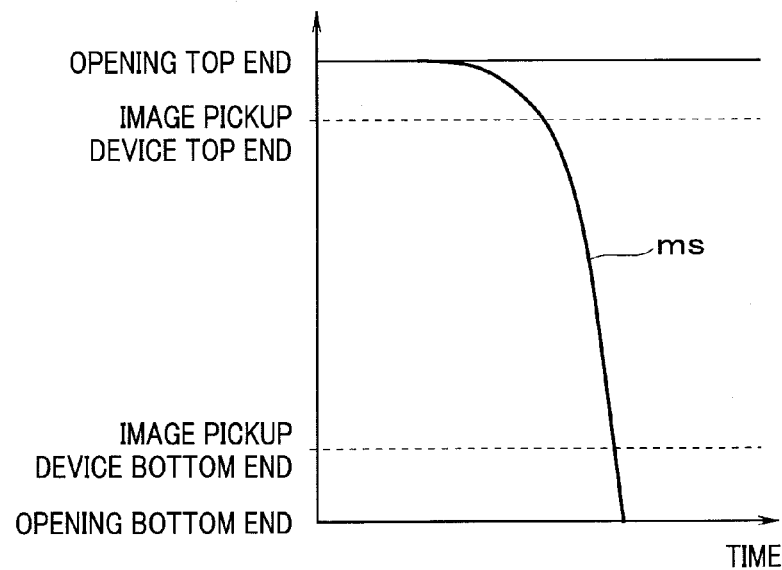
FIG. 8 is a diagram illustrating running characteristics ms of the mechanical rear curtain shutter according to Embodiment 1 described above.

Next, FIG. 8 is a diagram illustrating running characteristics ms of the mechanical rear curtain shutter 3. In FIG. 8, the vertical axis shows the vertical direction of the image pickup device 4, which is the running direction of the mechanical rear curtain shutter 3, and the horizontal axis shows an elapsed time.

As described above, the mechanical rear curtain shutter 3 is structured to run by being pulled in the running direction by an elastic force of a spring. Thus, immediately after the running starts, the running speed is slow and gradually accelerated as the running proceeds downward. FIG. 8 shows a situation in which the bottom end of the curtain, which is the distal end of shading of the mechanical rear curtain shutter 3, moves from the top end to the bottom end of the image pickup device 4 with a lapse of time as running characteristics ms. Since the exposure opening section 31 is configured to be larger than the image pickup plane 22 of the image pickup device 4 so as not to eclipse a photographing luminous flux, the movement range of the mechanical rear curtain shutter 3 is larger than the width in the vertical direction of the image pickup device 4 and becomes a range that can cover the width in the vertical direction of the exposure opening 31. Therefore, when the mechanical rear curtain shutter 3 reaches the top end of the image pickup device 4, a certain degree of running speed is achieved and it is thereby possible to obtain relatively linear running characteristics ms on the image pickup device 4.

Figure 9:
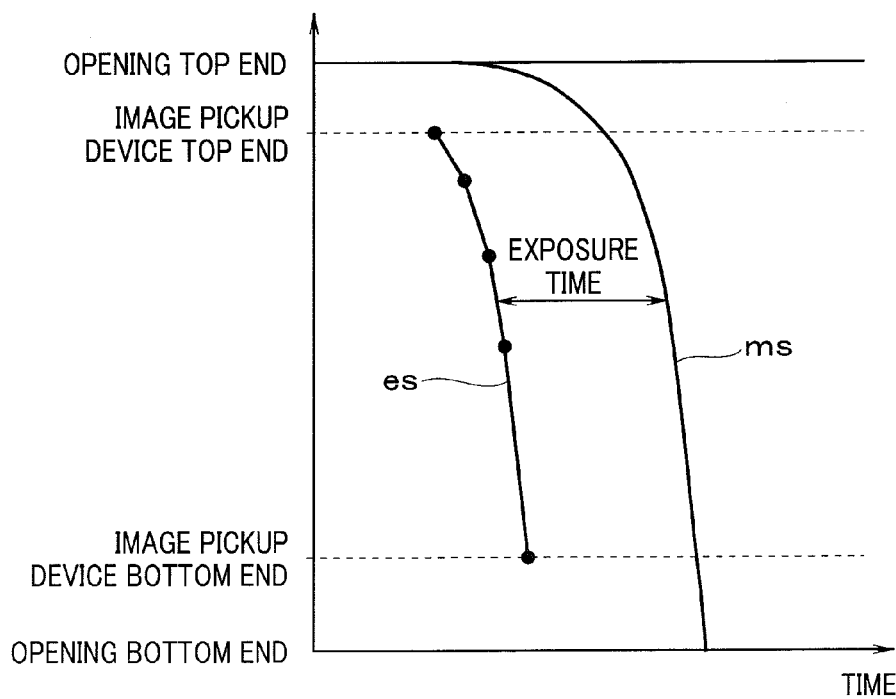
FIG. 9 is a diagram illustrating a situation in which running characteristics es of the electronic reset are set according to the running characteristics ms of the mechanical rear curtain shutter according to Embodiment 1 described above.

Next, FIG. 9 is a diagram illustrating a situation in which running characteristics es of the electronic reset are set according to the running characteristics ms of the mechanical rear curtain shutter 3. The vertical axis and the horizontal axis shown in FIG. 9 are similar to those shown in FIG. 8.

The electronic reset shown in FIG. 9 is basically similar to the electronic reset described in Japanese Patent Application Laid-Open Publication No. 11-41523 mentioned in the related art.

That is, timing of the electronic reset (running characteristics es) is controlled according to the non-linear running characteristics ms of the mechanical rear curtain shutter 3. However, the electronic reset is set so that lines 1 to n are divided into a plurality of regions (four regions in the example shown in FIG. 9) to have linear running characteristics for each region. Thus, the running characteristics es of the electronic reset are obtained by shifting the running characteristics ms in the direction going back by the exposure time and approximating this with a polygonal line.

Next, how the linear running characteristics are set for each region will be described. First, since the electronic front curtain shutter operated by electronic reset of the pixels 21 simplifies the drive circuit or eliminates the necessity of an expensive drive clock as described above, the electronic reset is generally performed collectively for every plurality of lines, not at timing line by line (as described above, the electronic front curtain shutter achieved by sequentially resetting pixels at timing for every plurality of lines is referred to as "block electronic front curtain" or the like for brevity as appropriate) With the block electronic front curtain, pixels included in a plurality of lines are simultaneously electronically reset, and these pixels make up one pixel group when the pixels arranged on the image pickup plane 22 are divided into a plurality of pixel groups along the running direction of the mechanical rear curtain shutter 3.

Figure 10:
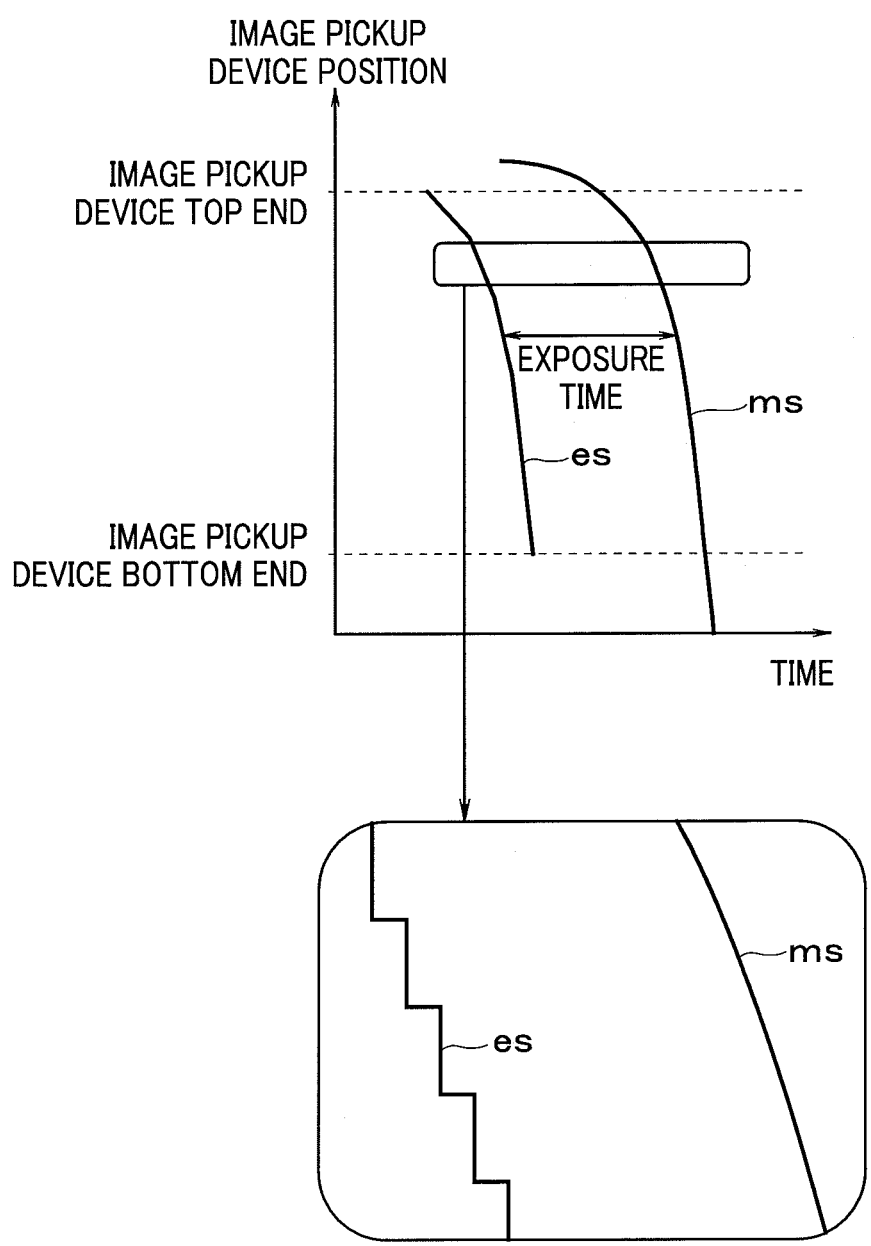
FIG. 10 is a diagram illustrating a partially enlarged view of running characteristics of the block electronic front curtain according to Embodiment 1 described above.

FIG. 10 is a diagram illustrating a partially enlarged view of running characteristics of the block electronic front curtain.

In order to achieve running characteristics es in polygonal line shape in accordance with the running characteristics ms of the mechanical rear curtain shutter 3 shown in FIG. 9 with such a block electronic front curtain, the number of lines when simultaneously resetting a plurality of lines may be changed, for example, for each region.

That is, assuming that nodes of the polygonal line are variation points of the number of lines to be simultaneously reset, the number of lines may be reduced on the upper side of the image pickup device 4 where the running speed of the mechanical rear curtain shutter 3 is slow, while the number of lines may be increased on the lower side of the image pickup device 4 where the running speed of the mechanical rear curtain shutter 3 is fast.

Figure 11:
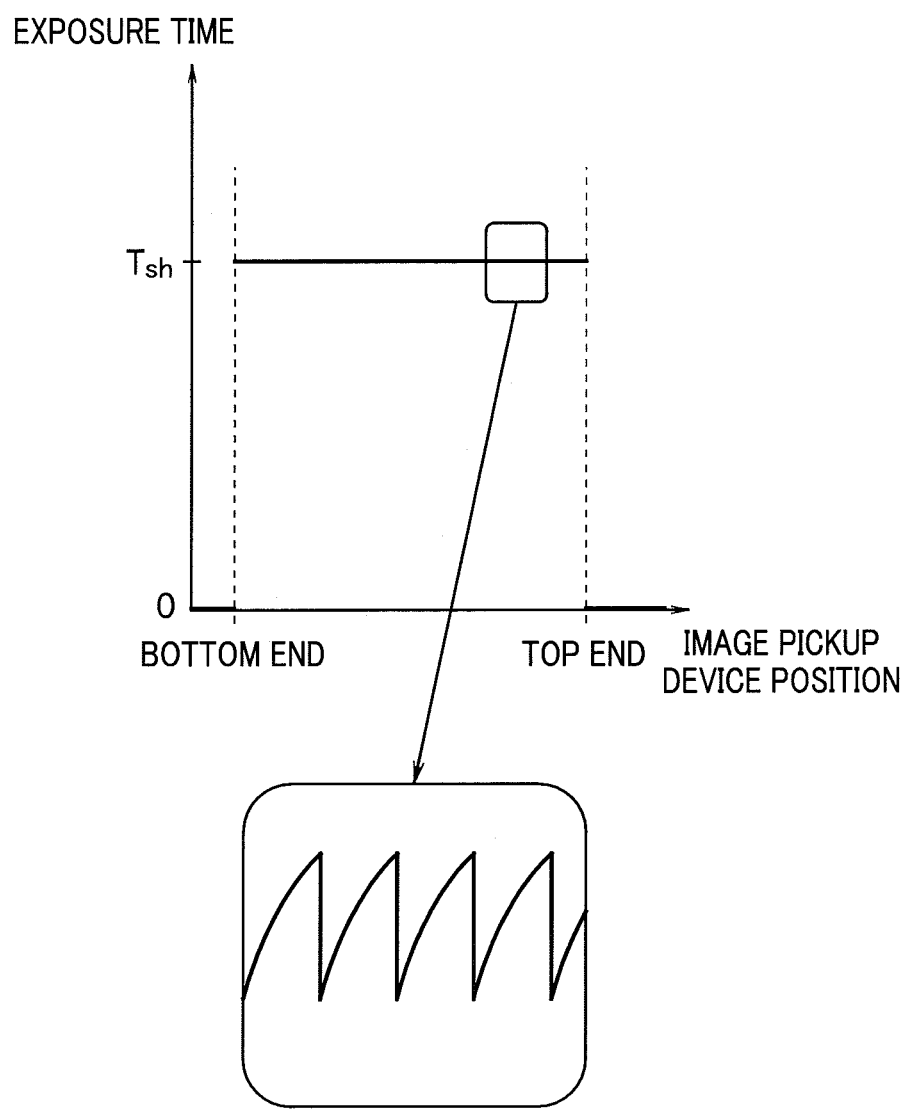
FIG. 11 is a diagram illustrating an exposure variation generated when a plurality of lines are simultaneously reset according to Embodiment 1 described above.

Even when the running speed of the mechanical rear curtain shutter 3 differs between the upper and lower sides of the image pickup device 4, this makes it possible to roughly suppress an exposure variation and achieve a substantially uniform exposure time over the entire region of the image pickup device 4 especially when shutter speed is slow. However, when the shutter speed is fast, it is no longer possible to ignore the exposure variation caused by collectively (simultaneously) resetting a plurality of lines. FIG. 11 is a diagram illustrating an exposure variation generated by simultaneously resetting a plurality of lines.

As shown in the enlarged view of FIG. 10, the mechanical rear curtain shutter 3 is smoothly running (running characteristics ms), whereas the electronic front curtain shutter by the electronic reset has stepped running characteristics es, and since a plurality of lines are simultaneously reset in particular, the width of the steps also increases according to the number of simultaneously reset lines.

Assuming an exposure time set by the system control section 10 is $T_{sh}$, the real exposure time of each line changes in the saw-tooth shape as shown in the partial enlarged view in FIG. 11. When the exposure time $T_{sh}$ is sufficiently large compared to the amplitude of the saw-tooth shaped variation (that is, when the shutter speed is sufficiently slow), influences of the exposure variation can be mostly ignored, but when the exposure time $T_{sh}$ decreases (that is, the shutter speed increases), influences of the exposure variation can no longer be ignored. That is, when the shutter speed is fast, a luminance variation of short period in the vertical direction appears in the picked up image due to the saw-tooth shaped exposure time variation in the shutter running direction (vertical direction), and this is observed as a fine stripe pattern in the horizontal direction.

Figure 12:
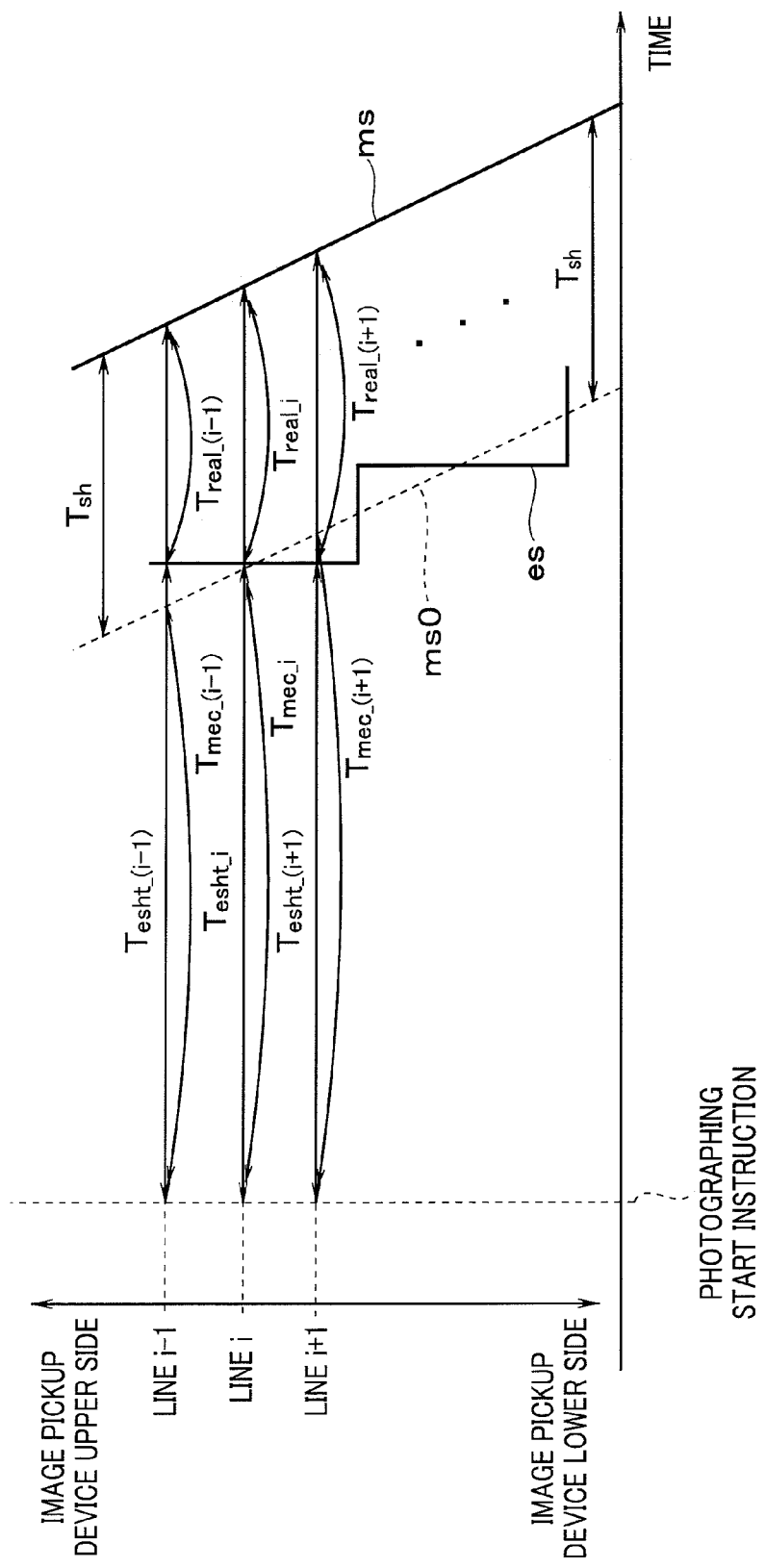
FIG. 12 is a diagram illustrating a method of calculating a real exposure time according to Embodiment 1 described above.

In order to cope with such deterioration of image quality, the present embodiment calculates a real exposure time of each line based on the timing setting information of electronic reset and running characteristics of the mechanical rear curtain shutter, compares the real exposure time with a set exposure time and thereby corrects the exposure variation. FIG. 12 is a diagram illustrating a method of calculating a real exposure time.

First, the electronic reset timing of the image pickup device 4 is adjusted beforehand in accordance with the running characteristics of the mechanical rear curtain shutter 3 as described above. To be more specific, the electronic reset timing (running characteristics es) is set beforehand so as to be timing approximate to running characteristics ms0 of the mechanical rear curtain shutter 3 when the set exposure time $T_{sh}$ is 0.

Such a setting is made as follows.

That is, time $T_{mec\_i}$ after a photographing start instruction is generated from the system control section 10 until the mechanical rear curtain shutter 3 runs through a target line when the exposure time $T_{sh}$ is 0 is measured for each line first. What is determined by these times $T_{mec\_i}$ measured for the respective lines is running characteristics ms0 of the mechanical rear curtain shutter 3 when the exposure time $T_{sh}$ is 0 shown by a dotted line in FIG. 12.

Next, the electronic reset timing is set so that the exposure variation is optimally suppressed in accordance with the running characteristics ms0 of the mechanical rear curtain shutter 3. A specific example of such optimization is as follows. Suppose the time after a photographing start instruction on an arbitrary line i is generated until electronic reset is performed is $T_{esht\_i}$. In this case, it is possible to consider an example of setting $T_{esht\_i}$ so that a value obtained by adding up $|T_{mec\_i} - T_{esht\_i}|$ for all lines (i=1 to n) by changing the line positions of variation points (what numbered line should be set as a variation point) and the number of collectively reset lines (gradient of one line segment on the polygonal line) takes a minimum value under a constraining condition, for example, that the number of variation points shown in FIG. 9 is predetermined in the design. However, when correcting the exposure variation through image processing, the image obtained from the image pickup device 4 may be more preferably underexposure than overexposure or vice versa, and therefore $T_{esht\_i}$ may be set so that the running characteristics es approximate to the running characteristics ms0 without being limited to the example described here.

The time $T_{esht\_i}$ indicating the electronic reset timing and the time $T_{mec\_i}$ indicating the timing corresponding to the running characteristics ms0 of the mechanical rear curtain shutter 3 set in this way are stored in the internal memory 6.

Figure 13:
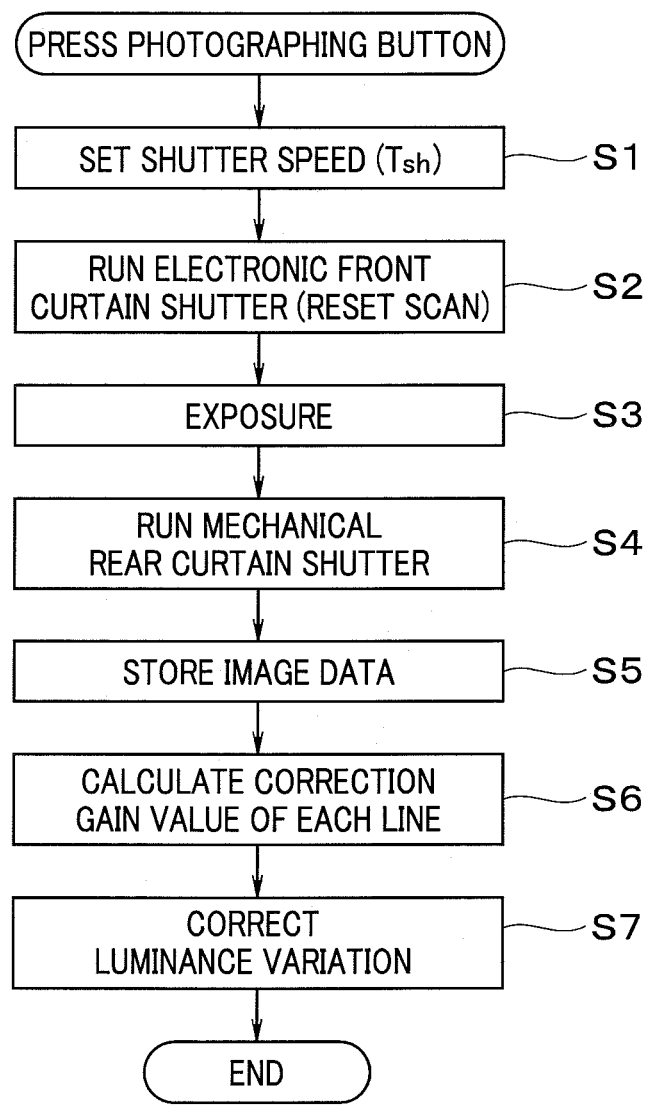
FIG. 13 is a flowchart illustrating an example of a photographing sequence when the photographing button is pressed according to Embodiment 1 described above.

When photographing a still image, the following processing is performed. Here, FIG. 13 is a flowchart illustrating an example of the photographing sequence when the photographing button is pressed.

When the photographing button is pressed, the system control section 10 sets an exposure time (shutter speed) $T_{sh}$ based on a manual setting or automatic setting (step S1).

Next, the system control section 10 reads the time $T_{esht\_i}$ indicating the electronic reset timing from the internal memory 6, controls the image pickup device 4 so as to perform the electronic reset at this timing and causes the electronic front curtain shutter to run (step S2). Exposure is performed from the line on which the electronic front curtain shutter finishes running and charge is accumulated in the photodiodes of the pixels 21 (step S3).

When the exposure time $T_{sh}$ has elapsed after electronic front curtain shutter started running, the system control section 10 causes the mechanical rear curtain shutter 3 to start running (step S4).

When the mechanical rear curtain shutter 3 finishes running, the system control section 10 causes image data to be read from the image pickup device 4 and causes, for example, the image data storage section or the like in the image processing section 5 to store the image data (step S5).

Furthermore, the system control section 10 reads the $T_{esht\_i}$ and $T_{mec\_i}$ from the internal memory 6 and calculates a real exposure time $T_{real\_i}$ on line i according to the following Equation 1.

$$T_{real\_i}=(T_{mec\_i}+T_{sh})-T_{esht\_i}$$

An exposure variation is generated resulting from an error between the set shutter speed (set exposure time) $T_{sh}$ and the real exposure time $T_{real\_i}$. Thus, the system control section 10 calculates a correction coefficient $G_i$ which becomes a gain value to correct the exposure variation on line i according to the following Equation 2.

$$G_i=T_{sh}/T_{real\_i}=T_{sh}/\{(T_{mec\_i}+T_{sh})-T_{esht\_i}\}$$

The system control section 10 then outputs the calculated correction coefficient $G_i$ to the image processing section 5 (step S6). Thus, the system control section 10 is intended to function as a correction coefficient calculation section.

Assuming that the signal level on line i of the image data photographed and outputted by the image pickup device 4 is $SIG_{raw-i}$ the system control section 10 causes the image processing section 5 to perform image processing according to the following Equation 3:

$$SIG_{correct\_i}=G_i\times SIG_{raw-i}$$

on all lines (i=1 to n) to thereby calculate a signal level $SIG_{correct\_i}$ corrected (that is, without any exposure variation) so as to approximate to an image signal obtained when the respective pixels have the same exposure time (step S7) Here, since the correction coefficient $G_i$ is assumed to be a correction gain value, correction can be made only by performing a multiplication, high-speed processing even applicable to real-time processing is made possible or can also be performed simultaneously with other image processing.

This processing ends when the luminance variation is thus corrected in this way.

Figure 14:
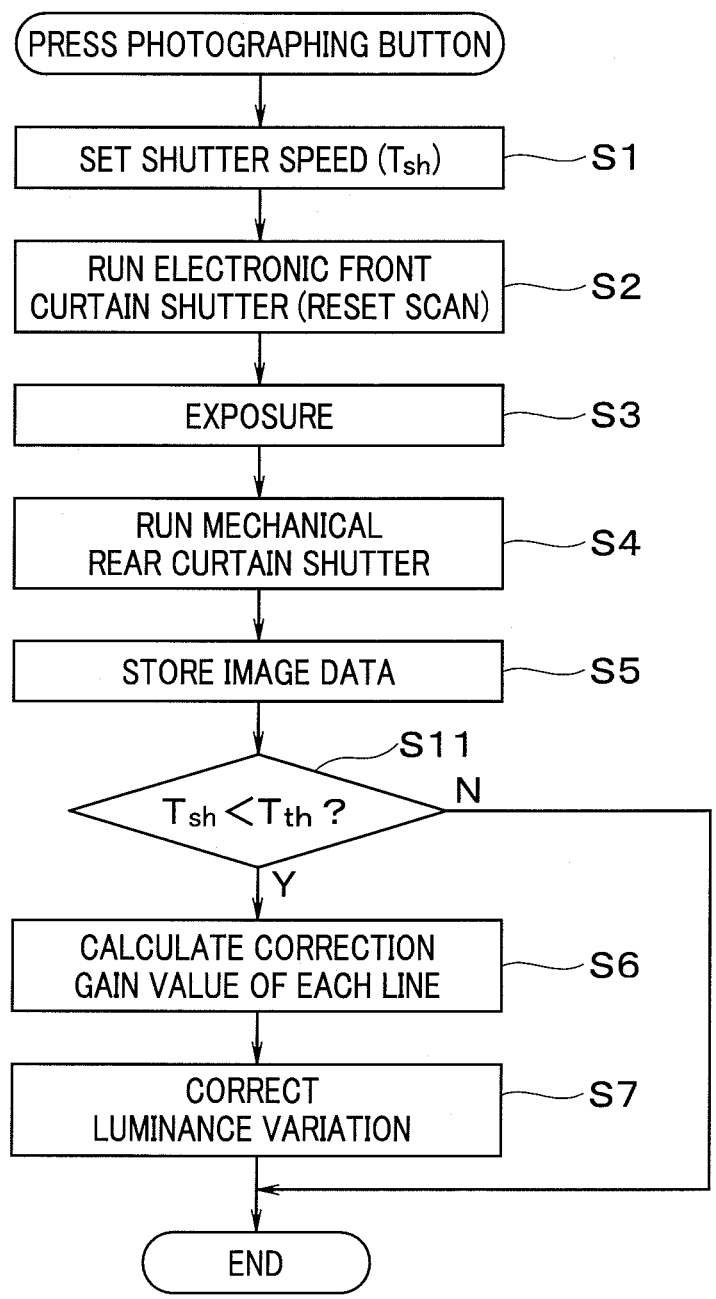
FIG. 14 is a flowchart illustrating another example of the photographing sequence when the photographing button is pressed according to Embodiment 1 described above.

Next, FIG. 14 is a flowchart illustrating another example of the photographing sequence when the photographing button is pressed.

When the aforementioned processing in steps S1 to S5 is performed, the system control section 10, which is the control section, determines whether or not the set shutter speed $T_{sh}$ is less than a predetermined threshold $T_{th}$ (step S11). Here, when the shutter speed $T_{sh}$ is equal to or above the predetermined threshold $T_{th}$ (that is, the exposure time is long), the exposure variation as shown in FIG. 11 can be practically ignored and when the shutter speed $T_{sh}$ is less than the threshold $T_{th}$ (that is, the exposure time is short), the threshold $T_{th}$ is a threshold that indicates a section where the exposure variation is preferably corrected.

In step S11, the system control section 10 performs control, when the shutter speed $T_{sh}$ is determined to be less than the threshold $T_{th}$, the aforementioned processing in step S6 and step S7 or skips (stops), when the shutter speed $T_{sh}$ is determined to be equal to or above the threshold $T_{th}$, the processing in step S6 and step S7 and ends the processing.

Thus, Embodiment 1 uses the electronic front curtain shutter with higher control accuracy than the mechanical front curtain shutter as the front curtain shutter, and can thereby match the running characteristics of the front curtain to the running characteristics of the mechanical rear curtain shutter 3 with high accuracy and can also perform accurate exposure control on a high-speed shutter.

The present embodiment adopts a type of electronic front curtain shutter that collectively performs pixel reset for every plurality of lines (block electronic front curtain), and thereby simplifies the drive circuit and eliminates the necessity of an expensive drive clock.

Furthermore, the present embodiment corrects an exposure variation generated when the block electronic front curtain and the mechanical rear curtain shutter 3 are combined through image processing, and can thereby obtain a high quality image whose luminance variation is not noticeable even when a high-speed shutter is used.

In this case, since the present embodiment sequentially performs reset for each pixel group at timing approximate to the running characteristics of the mechanical rear curtain shutter 3 when the set shutter speed $T_{sh}$ is 0, and can thereby reduce the magnitude of the exposure variation to be corrected and reduce deterioration of image quality when correcting the exposure variation through image processing.

In addition, the present embodiment classifies whether or not to correct a luminance variation according to the shutter speed, and can thereby reduce a processing load when a low-speed shutter is used, a luminance variation of which can be ignored, and reduce the processing time and power consumption.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising: a photographing lens that forms a subject image; an image pickup device having an image pickup plane on which pixels for accumulating an amount of charge corresponding to a light quantity of light received via the photographing lens are two-dimensionally arranged; a mechanical rear curtain shutter that runs along the image pickup plane to move from a state in which light from the photographing lens reaches the image pickup plane to a shaded state; a reset section that divides the image pickup plane into a plurality of pixel groups, each including a plurality of lines of pixels, along the running direction ahead of running of the mechanical rear curtain shutter and collectively resets charge of all pixels included in one pixel group sequentially at timing per pixel group according to running characteristics of the mechanical rear curtain shutter; an image processing section that corrects a signal level of an image signal read from the image pickup device so as to approximate to an image signal obtained when the pixels have a same exposure time based on the running characteristics of the mechanical rear curtain shutter and reset timing for each pixel group by the reset section, to thereby correct an exposure variation caused by collectively resetting the pixel group including the plurality of lines of pixels; and a correction coefficient calculation section that calculates a correction coefficient for each of a plurality of pixel lines (i) using a set exposure time ($T_{sh}$), a time after a photographing start instruction is generated until the mechanical rear curtain shutter runs through the pixel line ($T_{mec\_i}$), and a time after the photographing start instruction is generated on the pixel line until electronic reset is performed ($T_{esht\_i}$), wherein the image processing section corrects a signal level based on the correction coefficients and wherein the correction coefficient calculation section calculates a correction coefficient ($G_i$) for each of a plurality of pixel lines using the expression:

$$G_i = \frac{T_{sh}}{(T_{mec_i} + T_{sh}) - T_{esht\_i}}.$$

2. The image pickup apparatus according to claim 1, further comprising a correction coefficient calculation section that calculates a correction coefficient based on running characteristics of the mechanical rear curtain shutter and reset timing per pixel group by the reset section, wherein the image processing section corrects a signal level based on the correction coefficient.

3. The image pickup apparatus according to claim 1, further comprising a control section that determines whether or not a set shutter speed is less than a predetermined threshold, causes the image processing section, upon determining that the shutter speed is less than the threshold, to correct the signal level or causes the image processing section, upon determining that the shutter speed is equal to or above the threshold, to not correct the signal level.

4. The image pickup apparatus according to claim 1, wherein the reset section sequentially performs reset per pixel group at timing approximate to running characteristics of the mechanical rear curtain shutter when the set shutter speed is 0.

* * * * *